(12) United States Patent
Okamoto

(10) Patent No.: US 8,788,752 B2
(45) Date of Patent: Jul. 22, 2014

(54) STORAGE APPARATUS, PATROLLING METHOD AND STORAGE SYSTEM

(75) Inventor: Hiroshi Okamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 829 days.

(21) Appl. No.: 13/014,357

(22) Filed: Jan. 26, 2011

(65) Prior Publication Data

US 2011/0197025 A1 Aug. 11, 2011

(30) Foreign Application Priority Data

Feb. 8, 2010 (JP) ................................ 2010-025979

(51) Int. Cl.
*G06F 12/06* (2006.01)

(52) U.S. Cl.
USPC ........................................ 711/114; 711/112

(58) Field of Classification Search
CPC ...................................................... G06F 11/22
USPC ................................................. 711/112, 114
See application file for complete search history.

(56) References Cited

U.S. PATENT DOCUMENTS

| | | | |
|---|---|---|---|
| 2005/0091266 A1 | 4/2005 | Hasegawa | |
| 2007/0266037 A1* | 11/2007 | Terry et al. | 707/100 |
| 2009/0164844 A1* | 6/2009 | Tamura et al. | 714/25 |
| 2009/0204752 A1* | 8/2009 | Sasaki | 711/105 |

FOREIGN PATENT DOCUMENTS

| | | |
|---|---|---|
| JP | 11-24956 A | 1/1999 |
| JP | 2003-303057 A | 10/2003 |
| JP | 2005-128771 A | 5/2005 |
| JP | 2006-293543 A | 10/2006 |
| JP | 2008-27240 A | 2/2008 |
| WO | WO-2009/001413 A1 | 12/2008 |

OTHER PUBLICATIONS

Japanese Office Action mailed Oct. 8, 2013 for corresponding Japanese Application No. 2010-025979, with Partial English-language Translation.

* cited by examiner

*Primary Examiner* — Kenneth Lo
(74) *Attorney, Agent, or Firm* — Fujitsu Patent Center

(57) ABSTRACT

A storage apparatus includes a written state bit map memory that stores a written state bit map that includes bits each allocated to one of partial areas of a storage device for storing write management information indicating whether written data is present in a partial area of the storage device that is allocated to one of the bits, a bit map management section, when data is written into a partial area of the storage device in response to a write request from the host apparatus, that sets a value indicating that the data is written into the partial area to a bit allocated to the partial area in which the data is written, and a patrolling process section for performing a patrolling process on the partial areas of the storage device on the basis of the write management information stored in the written state bit map memory.

9 Claims, 10 Drawing Sheets

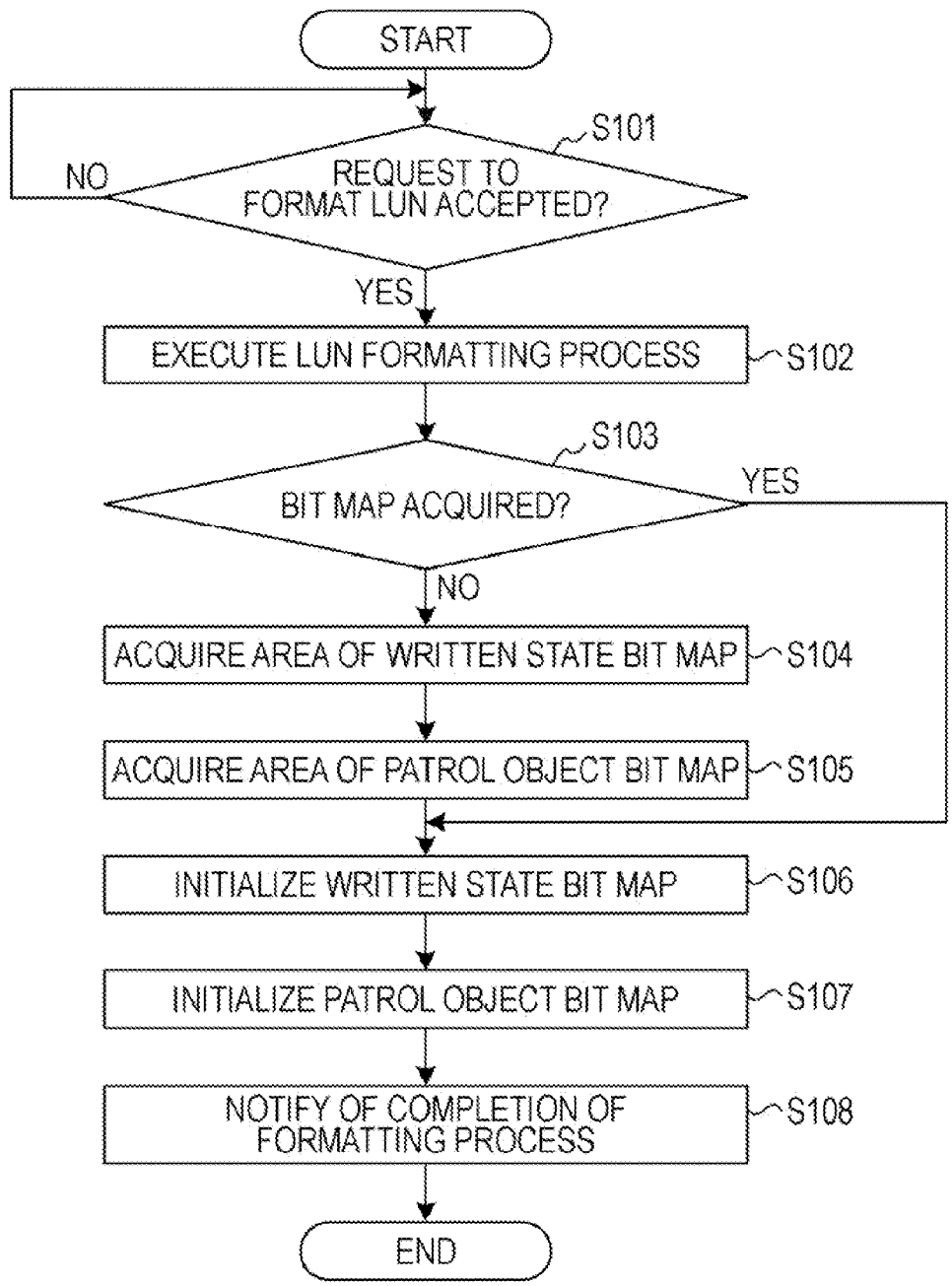

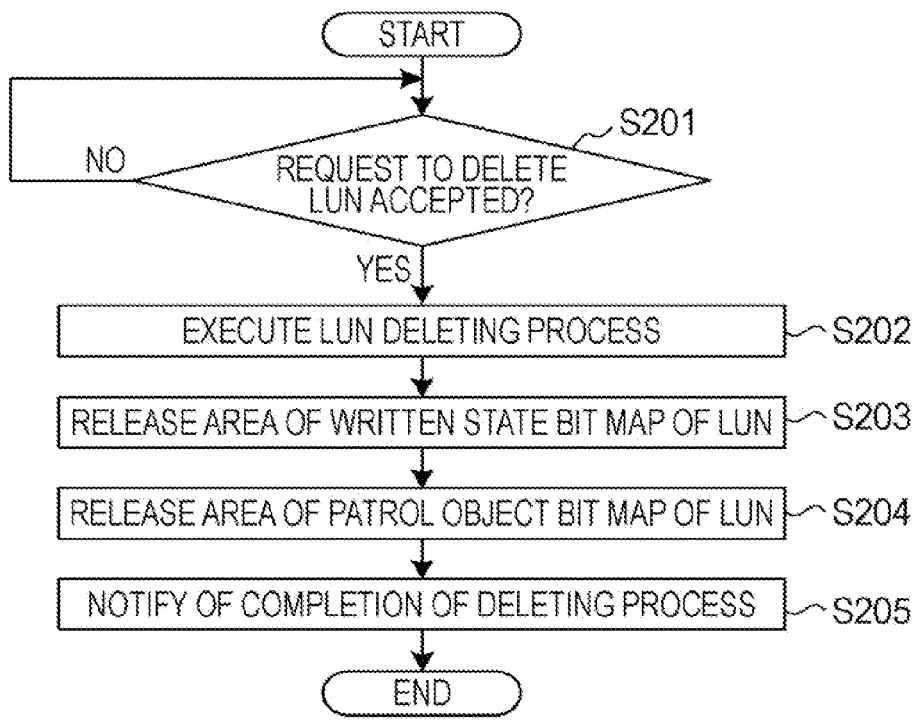
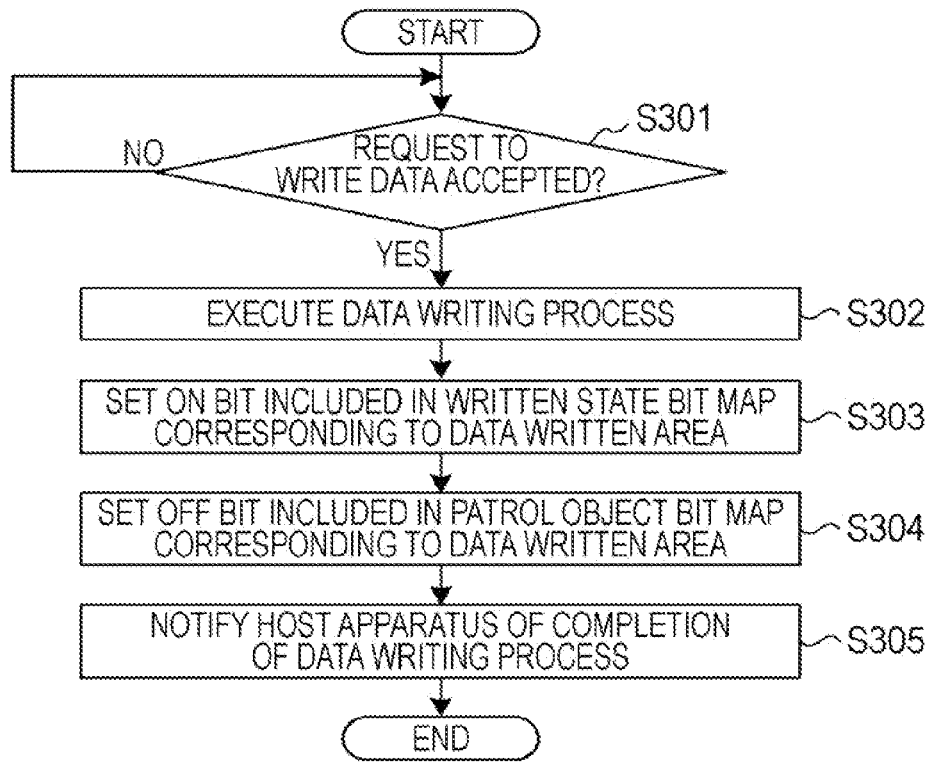

STORAGE APPARATUS, PATROLLING METHOD AND STORAGE SYSTEM

CROSS-REFERENCE TO RELATED APPLICATIONS

This application is based upon and claims the benefit of priority of the prior Japanese Patent Application No. 2010-25979, filed on Feb. 8, 2010, the entire contents of which are incorporated herein by reference.

FIELD

The embodiments discussed herein are related to a storage apparatus, a patrolling method, and a storage system.

BACKGROUND

Nowadays, there exists a technique for dividing storage devices into groups and distributing and redundantizing user data among storage devices in each group so as to increase the reliability of them as one storage apparatus. For example, a disk array apparatus which is called a RAID (Redundant Arrays of Inexpensive Disks) in which hard disk devices are used as storage devices is known.

In a storage apparatus of the above mentioned type, typically, immediately after user data has been written into a storage device, the user data is again read out of the storage device so as to confirm whether the read user data matches the written user data. In the storage apparatus, the possibility that the user data is read out of the storage device immediately after it has been written into the storage device is higher than that in an archive apparatus and the validity of the user data which has been just written into the storage device is secured by confirming matching between the written data and the read data in the above mentioned manner.

On the other hand, in some cases, user data which has been recorded, for example, in a hard disk may turn to invalid data owing to degradation of magnetism of the hard disk and may be detected as invalid data through CRC (Cyclic Redundancy Check) and inspection of a block ID. Therefore, a patrol diagnostic technique for detecting in advance data that has turned to invalid data (hereinafter, referred to as "bad data") although it is written into a storage device is known.

Japanese Laid-open Patent Publication No. 11-24956 and Japanese Laid-open Patent Publication No. 2008-27240 are examples of related art.

However, an existing patrol diagnostic technique has such a problem that in the case that the whole of a LUN (Logical Unit Number) is set as a patrol object (an object to be patrolled), much time may be taken to patrol the LUN. In the following, the above mentioned problem is specifically described. A storage apparatus includes more areas into which nothing is written than areas into which user data is written in response to a request from a host apparatus. However, the storage apparatus may not recognize a location in a storage device into which the user data is written. Thus, in the case the whole of the LUN is set as the patrol object, it may become unavoidable to patrol all of the storage devices included therein and hence much time may be taken to patrol the LUN. In particular, in the case that a new storage apparatus has been introduced, much time may be taken to patrol all of the storage devices included in the newly introduced storage apparatus in spite of the fact that areas with no user data written have a majority and hence patrolling may not be performed efficiently.

In addition, in the case that the whole of the LUN is set as a patrol object, patrol diagnosis is intermittently performed at such a timing that it is performed, for example, once every several seconds so as not to adversely affect input-output (I/O) performed using a host apparatus. Thus, the time taken until patrolling of the LUN is completed may be further increased.

Under the above mentioned circumstances, how patrolling is efficiently performed in a short period of time becomes a serious problem to be solved in the case that the whole of each storage device is set as a patrol object.

SUMMARY

According to an aspect of the invention, a storage apparatus includes a storage device for storing data from a host apparatus, a written state bit map memory that stores a written state bit map that includes bits each allocated to one of partial areas of the storage device for storing write management information indicating whether written data is present in a partial area of the storage device that is allocated to one of the bits, a bit map management section, when data is written into a partial area of the storage device in response to a write request from the host apparatus, that sets a value indicating that the data is written into the partial area to a bit allocated to the partial area in which the data is written, and a patrolling process section for performing a patrolling process on the partial areas of the storage device on the basis of the write management information stored in the written state bit map memory.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 5 is a flowchart illustrating an example of processing procedures executed in the case that a disk array apparatus has accepted an instruction to format a LUN.

FIG. 6 is a flowchart illustrating an example of processing procedures executed in the case that the disk array apparatus has accepted an instruction to delete a LUN.

FIG. 7 is a flowchart illustrating an example of processing procedures executed in the case that the disk array apparatus has accepted a request to write data into a storage device from a host apparatus.

DESCRIPTION OF EMBODIMENTS

In the following, embodiments of the storage apparatus, the patrolling method, the patrolling program and the storage system disclosed herein are described in detail with reference to the accompanying drawings. Incidentally, the present technique is not limited by the embodiments which are described below.

First Embodiment

Figure 1:
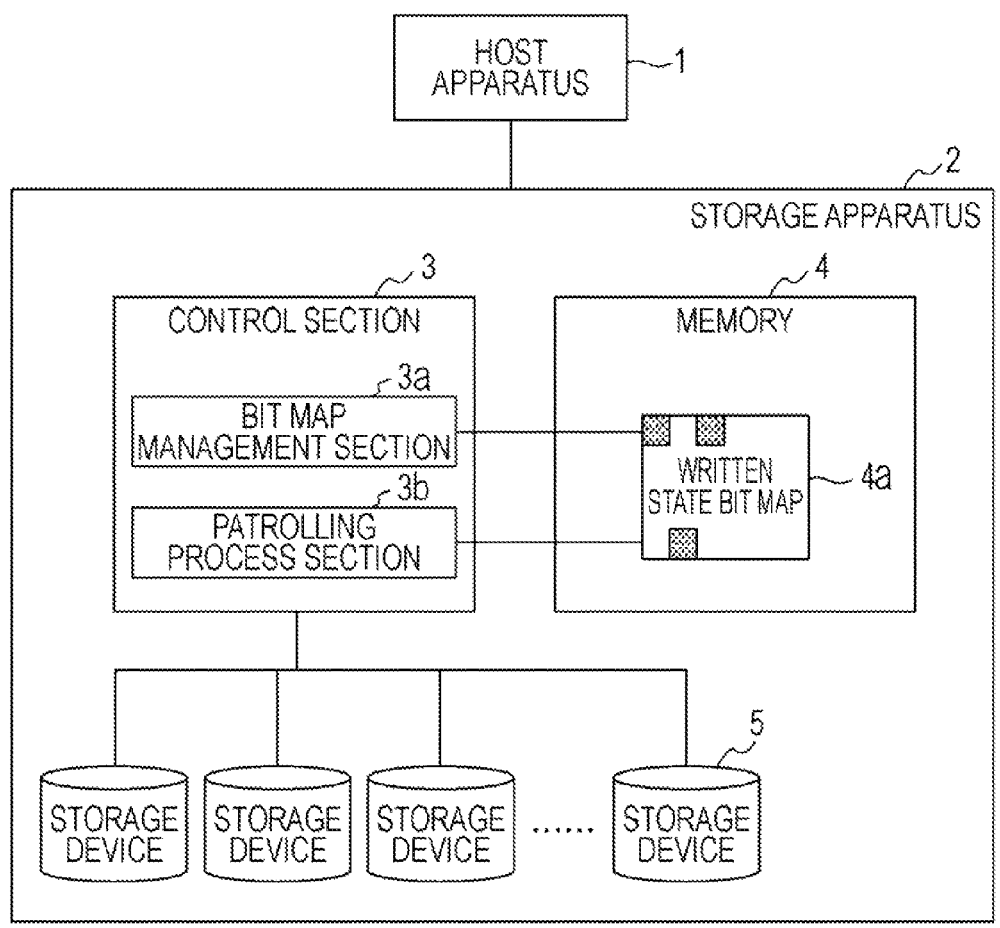
FIG. 1 is a functional block diagram illustrating an example of a configuration of a storage system according to a first embodiment.

FIG. 1 is a functional block diagram illustrating an example of a configuration of a storage system according to the first embodiment. As illustrated in the example in FIG. 1, the storage system includes a host apparatus 1 and a storage apparatus 2. The host apparatus 1 is a master apparatus that requests to read data out of the storage apparatus 2 and write data into it.

The storage apparatus 2 is a storage from which data is read in response to a request to read data out of the storage apparatus 2 from the host apparatus 1 and a storage into which data is written in response to a request to write data into it from the host apparatus 1, and the storage apparatus 2 includes a control section 3, a memory 4 and storage devices 5. The control section 3 is a control section that controls the general operation of the storage apparatus 2, and the control section 3 includes a bit map management section 3a and a patrolling process section 3b. A written state bit map 4a is stored in the memory 4. The storage device 5 is a memory device such as a magnetic disk device and the like.

Incidentally, the written state bit map 4a is a bit map of the type that bits are respectively allocated to partial areas (hereinafter, simply referred to as "areas") of a memory area included in each storage device 5 and each bit is set on or off depending on whether there exists written data in each area. That is, the written state bit map 4a includes write management information indicating into which area of the storage device 5 data is written.

The bit map management section 3a is a management section that manages the written state bit map 4a and, in the case that data has been written into a predetermined area in response to a request sent from the host apparatus 1, sets on the bit which has been allocated to the predetermined area in the written state bit map 4a.

The patrolling process section 3b performs a so-called patrolling process to check to see whether data stored in the storage device 5 has turned to bad data. The patrolling process is a process that the storage apparatus 2 periodically checks a medium of the storage device 5 in the background to see whether an error occurs in the medium or data is defectively written.

The patrolling process section 3b performs the patrolling process on each area of the storage device 5 on the basis of bits included in the written state bit map 4a. Specifically, the patrolling process section 3b performs the patrolling process only on an area corresponding to an on-state bit which is included in the written state bit map 4a and does not perform the patrolling process on an area corresponding to an off-state bit in the written state bit map 4a. Incidentally, the characteristic of the first embodiment lies in that an area on which the patrolling process is to be performed is limited. The patrolling process may be performed in a variety of ways using various existing techniques.

In the case that the whole of the storage device 5 is set as a patrol object using the storage apparatus 2 configured as mentioned above, the patrolling process is performed on only an area in which data is stored in reality and hence short-time and highly efficient patrolling may be attained.

Moreover, in the first embodiment the patrolling process does not affect the performance of the storage system.

Second Embodiment

In the explanation of the first embodiment, description has been made focusing on the characteristic points of the storage apparatus of the present technique. Next, in the explanation of the second embodiment, a case in which the present technique has been applied to a disk array apparatus is specifically described.

Figure 2:
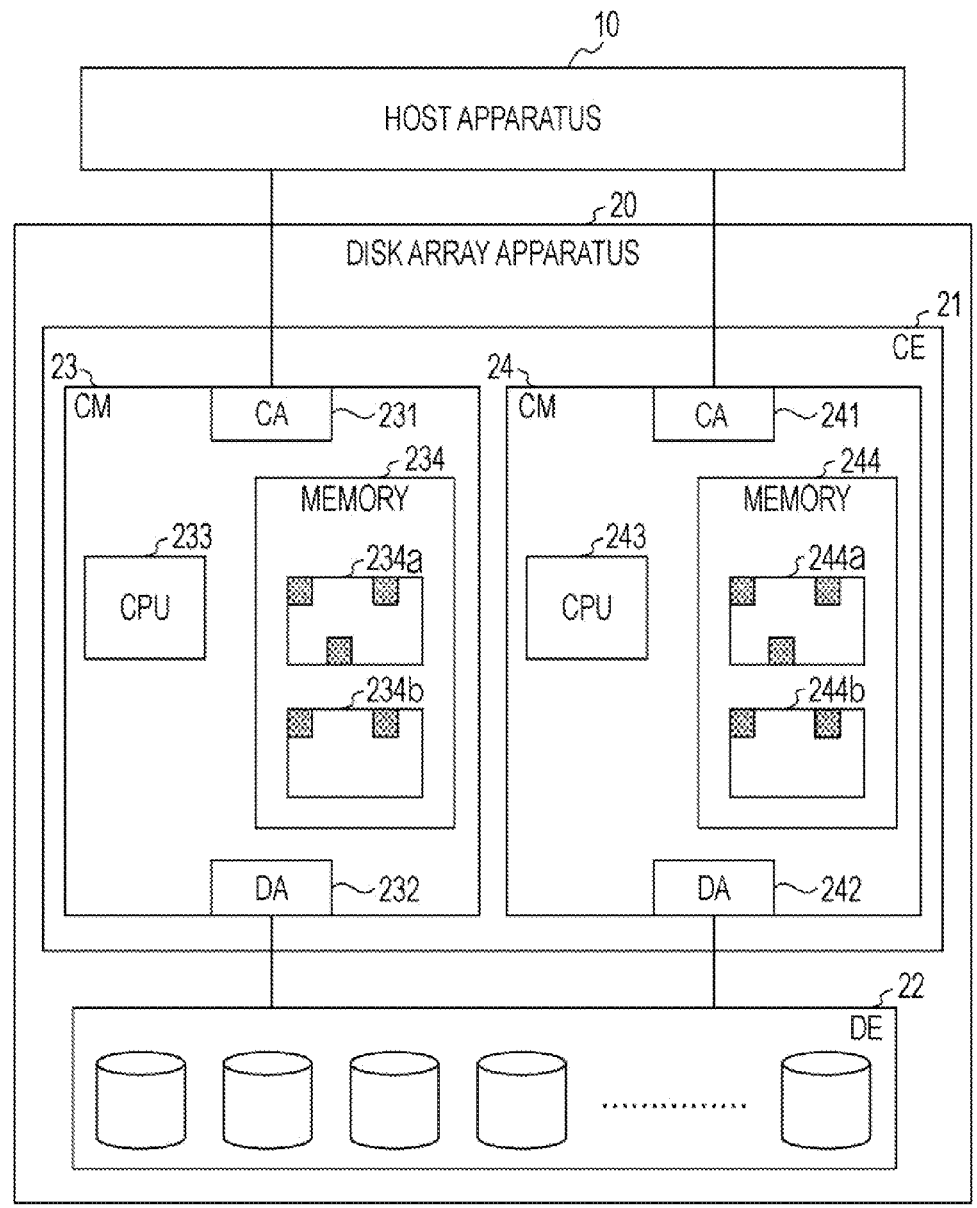
FIG. 2 is a block diagram illustrating an example of a configuration of a disk array apparatus according to a second embodiment.

FIG. 2 is a block diagram illustrating an example of a configuration of a disk array apparatus according to the second embodiment. As illustrated in the example in FIG. 2, a disk array apparatus 20 includes a CE (Controller Enclosure) 21 and a DE (Device Enclosure) 22. The CE includes a CM (Controller Module) 23 and a CM 24.

The CM 23 includes a CA (Channel Adapter) 231 that serves as an interface between the disk array apparatus 20 and the host apparatus 10, a DA (Device Adaptor) 232 that serves as an interface between CM 23 and the DE 22, a CPU 233 and a memory 234. Likewise, the CM 24 includes a CA 241, a DA 242, a CPU 243 and a memory 244. The host apparatus 10 is connected with the CM 23 and the CM 24 via the CA 231 and the CA 241 and each disk device in the DE 22 is connected with the CM 23 and the CM 24 via the DA 232 and the DA 242. Then, the plurality of disk devices in the DE 22 function as one mass logical disk device in accordance with control programs executed using the CPU 233 and the CPU 243.

In the above mentioned situation, the CM 23 and the CM 24 check to see whether data stored in the plurality of disk devices in the DE 22 has turned to invalid bad data (Bad Data) by performing the patrolling process. The reason for the above lies in that it may sometimes occur that data which has been normally written into the disk device turns to invalid bad data owing to later magnetic change or the like. Basically, the patrolling process is not performed under the control of the host apparatus and the CM 23 and the CM 24 themselves take the lead in performing the patrolling process.

In order to efficiently perform the patrolling process in a short time period, the disk array apparatus 20 according to the second embodiment stores a written state bit map 234a and a patrol object bit map 234b into the memory 234 of the CM 23. The written state bit map 234a and the patrol object bit map 234b are generated for each LUN (Logical Unit Number). Then, the CPU 233 of the CM 23 performs the efficient patrolling process which is described later with reference to the written state bit map 234a and the patrol object bit map 234b. Likewise, a written state bit map 244a and a patrol object bit map 244b are stored into the memory 244 of the CM 24 and the CPU 243 performs the efficient patrolling process which is described later with reference to the written state bit map 244a and the patrol object bit map 244b.

The written state bit map 234a is a bit map which indicates a written state of data concerned and in which bits are allocated to respective areas of a predetermined size obtained by partitioning the LUN and whether the written data is present in each area is indicated by the on/off state of each bit. When a bit concerned is "1", there exists data or the like which has been written into the area which is arranged in the LUN corresponding to the above bit in response to a request from the host apparatus 10. When a bit concerned is "0", data is not present in the area corresponding to the above bit in the LUN.

The patrol object bit map 234b is a bit map which indicates an area to be set as a patrol object and in which bits are allocated to respective areas of a predetermined size obtained by portioning the LUN and whether each area is to be set as a patrol object is indicated by the on/off state of each bit.

When a bit concerned is "1", the area which is arranged in the LUN corresponding to the above bit is set as a patrol object and when a bit concerned is "0", the area which is arranged in the LUN corresponding to the above bit is not set as a patrol object. The content of the written state bit map 234a is copied to the patrol object bit map 234b at a certain point of time so as to appropriately correct the content of the patrol object bit map 234b in accordance with a status of accessing to the LUN. For example, at the completion of performance of the patrolling process, the content of the written state bit map 234a is copied to the patrol object bit map 234b for generation of the next patrolling process. A process of correcting the patrol object bit map 234b is described later. Incidentally, the size of the patrol object bit map 234b is the same as that of the written state bit map 234a.

Figure 3:
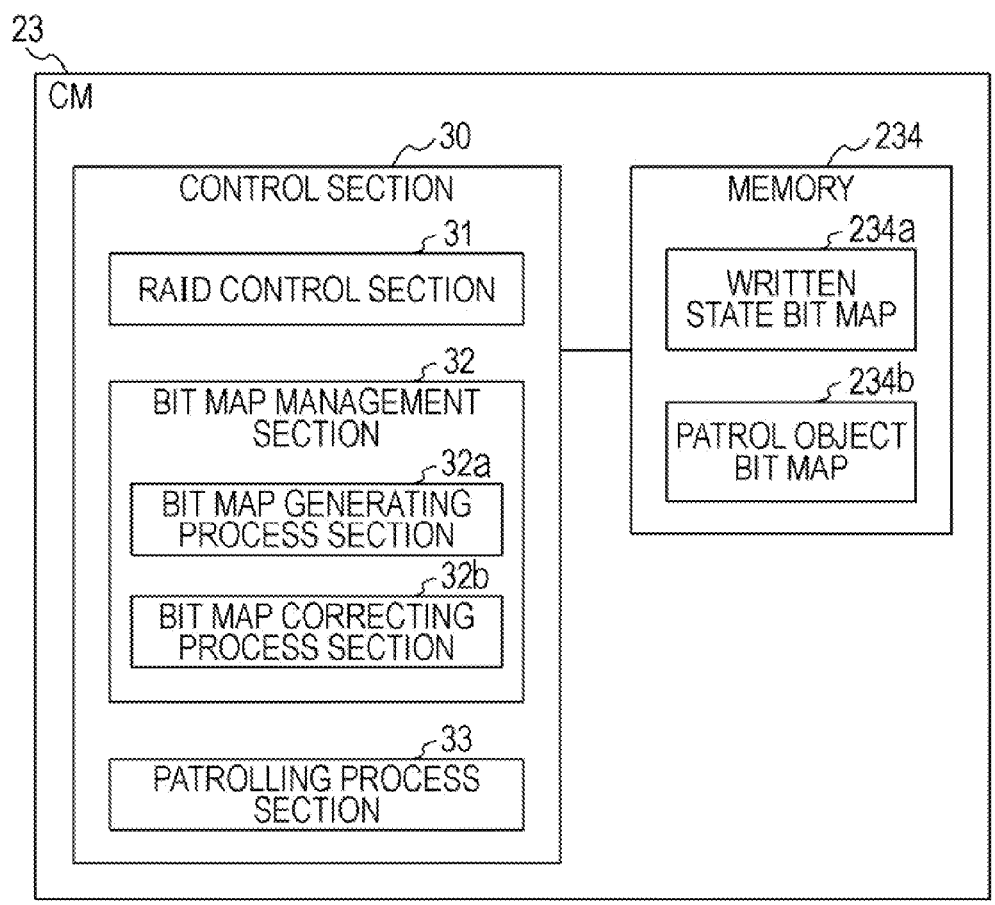
FIG. 3 is a functional block diagram illustrating an example of an internal configuration of a CM illustrated in FIG. 2.

FIG. 3 is a functional block diagram illustrating an example of an internal configuration of the CM 23 illustrated in FIG. 2. Incidentally, the CM 24 may be configured in the same manner as the CM 23. As illustrated in the example in FIG. 3, the CM 23 includes a control section 30 and the memory 234. The control section 30 includes a RAID control section 31, a bit map management section 32 and a patrolling process section 33. The written state bit map 234a and the patrol object bit map 234b are stored in the memory 234.

The RAID control section 31 manages the plurality of disk devices in the DE 22 as one logical disk device and controls storing operations of RAID 0 to RAID 6. The bit map management section 32 is a management section that manages processes including processes of generating, updating, correcting and releasing the written state bit map 234a and the patrol object bit map 234b which have been described above, and the bit map management section 32 includes a bit map generating process section 32a and a bit map correcting process section 32b.

The bit map generating process section 32a generates the written state bit map 234a and the patrol object bit map 234b. Specifically, in the case that the bit maps for a LUN are not yet acquired with certainty when an instruction to format the above LUN has been accepted from the host apparatus 10, the bit map generating process section 32a freshly generates the written state bit map 234a and the patrol object bit map 234b corresponding to the above LUN. Alternatively, when a data writing process is performed on a LUN concerned for the first time, the written state bit map 234a and the patrol object bit map 234b corresponding to the above LUN may be generated. In the case that an instruction to delete the LUN has been accepted from the host apparatus 10, the bit map generating process section 32a deletes data in the areas of the written state bit map 234a and the patrol object bit map 234b for the LUN concerned to release the bit maps.

The bit map correcting process section 32b corrects the content of the patrol object bit map 234b. Specifically, in the case that a request to write data has been freshly accepted from the host apparatus 10, the bit map correcting process section 32b sets off bits which are included in the written state bit map 234a and the patrol object bit map 234b corresponding to the area in the LUN into which the data is written. The reason for the above lies in the fact that the data is once read out to check for matching in writing the data into the area concerned and hence it is allowed not to perform the patrolling process on the area again. Incidentally, in the case that check for matching is not performed even in writing the data into the area concerned, whether check for matching has been performed is judged and in the case that it is judged that check for matching has been performed, the bit may be set off.

Likewise, in the case that a request for data reading has been freshly accepted from the host apparatus 10, the bit corresponding to the area out of which data is read is set off. The reason for the above lies in the fact that in the case that data reading has been appropriately performed, it is allowed not to perform the patrolling process on the area again.

The patrolling process section 33 performs the patrolling process in accordance with the on/off state of each bit in the patrol object bit map 234b. Specifically, the patrolling process section 33 regards an area corresponding to an on-state bit as a patrol object and regards an area corresponding to an off-state bit as an out-of-patrol object. Incidentally, the patrolling process may be specifically performed in a variety of ways by utilizing various existing techniques.

Figure 4:
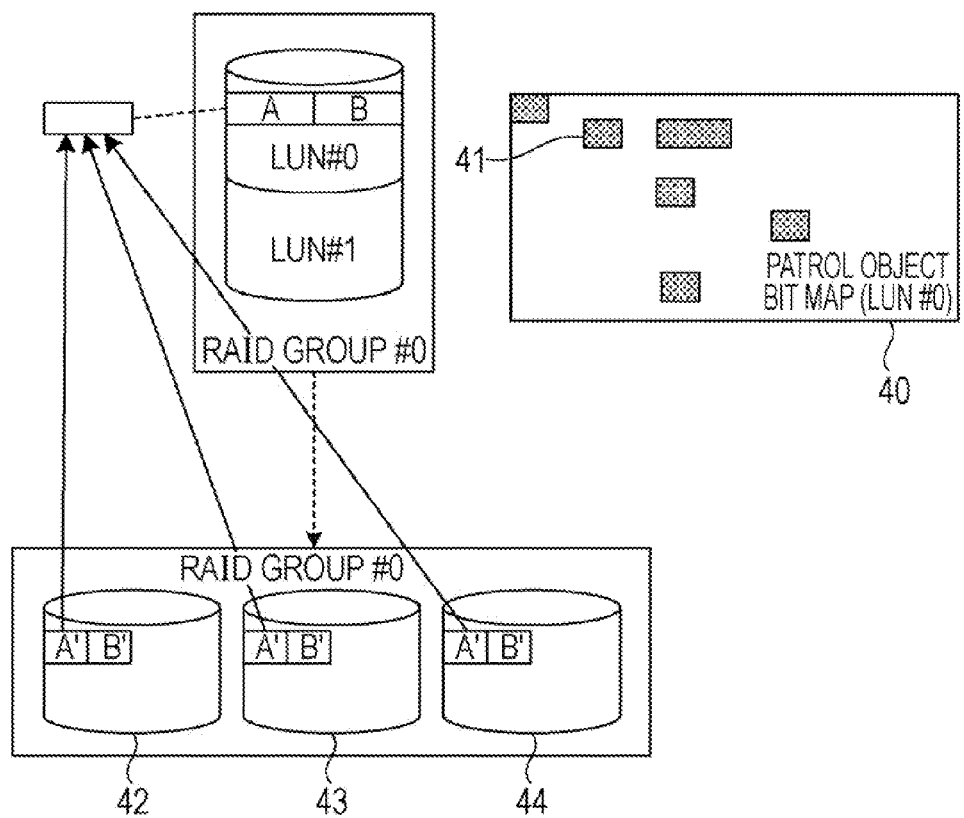
FIG. 4 is a diagram illustrating an example of a patrolling process performed using a patrolling process section illustrated in FIG. 3.

FIG. 4 is a diagram illustrating an example of a patrolling process to be performed using the patrolling process section 33 illustrated in FIG. 3. In the case that there exists a patrol object bit map 40 for a LUN#0 illustrated in FIG. 4, the patrolling process section 33 performs the patrolling process on an area corresponding to an on-state bit in the patrol object bit map 40.

For example, in the case that a bit 41 in the patrol object bit map 40 corresponds to an area A in the LUN#0, the area A in the LUN#0 is set as a patrol object. Then, the area A in the LUN #0 corresponds to respective areas A' in disk devices 42 to 44 of the DE 22, so that the patrolling process is performed on the areas A' in the disk devices 42 to 44 of the DE 22 in reality.

Next, the size per bit of the patrol object bit map 40 is described. In the disk array apparatus 20, the size per bit of the patrol object bit map 40 is set to a value which corresponds to a multiple of a stripe size and is determined in accordance with the number of disk devices included in a RAID. For example, in the example illustrated in FIG. 4, it is supposed that areas A' and B' of each of the disk devices 42 to 44 have sizes corresponding to a stripe size and the stripe size is 32 KB (kilobytes). In addition, in the example illustrated in FIG. 4, it is also supposed that data of the stripe size of 32 KB is stored into the areas A' in the disk devices 42 and 43 and parity thereof is stored into the disk device 44.

In the above mentioned case, the size per bit of the patrol object bit map 40 is set to "64 KB" which is a value corresponding to a multiple of the stripe size "32 KB" and determined in accordance with the number "2" of disks included in the RAID concerned. That is, it may become possible to patrol areas which are arranged in succession in a disk device by setting the size per bit in accordance with the stripe size and the number of disk devices in the RAID concerned and hence the number of commands to be given to the disk device may be reduced. Incidentally, although description of the size of the parity area is not made in relation to the size per bit of the patrol object bit map 40 in the above mentioned explanation, it is also supposed that the parity area is also set as a patrol object.

Owing to provision of the disk array apparatus 20 which is configured as mentioned above, when data is written into an area or data is read out of the area, the area is excluded so as not to be a patrol object and hence it may be allowed to perform the patrolling process only on an area patrolling of which is desirable. As a result, it may become possible to perform the patrolling process rapidly and efficiently.

Incidentally, programs corresponding to the RAID control section 31, the bit map management section 32 and the patrolling process section 33 illustrated in FIG. 3 are stored in a nonvolatile memory (not illustrated) and a ROM (not illustrated) in the CM 23. The CPU 233 reads and executes the above mentioned programs to make the bit map management section 32 and the patrolling process section 33 exhibits their functions. In addition, although in the above mentioned explanation, a case in which the written state bit map 234*a* and the patrol object bit map 234*b* are stored in a memory such as a RAM or the like has been described, it may be also possible to store the above mentioned bit maps into unused free spaces in a nonvolatile memory and/or the disk device of the DE 22 as places of refuge when a power source is turned off or in power failure. In the above mentioned case, the written state bit map 234*a* and the patrol object bit map 234*b* is read into a memory when the power source is again turned on.

Next, processing procedures executed in the case that the disk array apparatus 20 has accepted a request to format a LUN from a GUI (Graphical User Interface) or a CLI (Command Line Interface) after the LUN has been generated is described. FIG. 5 is a flowchart illustrating an example of processing procedures executed in the case that the disk array apparatus 20 has accepted the request to format the LUN.

As illustrated in the example illustrated in FIG. 5, the disk array apparatus 20 that has accepted the request to format the LUN from the GUI or the CLI (step S101: YES) executes a LUN formatting process (step S102).

Then, the disk array apparatus 20 confirms whether the bit maps for the LUN on which the formatting process is to be performed have been already acquired (step S103). In the case that the bit maps are not yet acquired (step S103: NO), the bit map generating process section 32*a* acquires the written state bit map 234*a* and the patrol object bit map 234*b* (step S104 and step S105). In the case that the bit map have already been acquired (step S103: YES), the process proceeds to step S106.

Then, the disk array apparatus 20 initializes the written state bit map 234*a* and the patrol object bit map 234*b* (step S106 and step S107) and notifies the GUI or the CLI of completion of execution of the LUN formatting process (step S108) to terminate execution of the process. By executing the process in the above mentioned manner, the written state bit map 234*a* and the patrol object bit map 234*b* may be generated as part of the LUN formatting process.

Next, processing procedures executed in the case that the disk array apparatus 20 has accepted a request to delete a LUN from the GUI or the CLI is described. FIG. 6 is a flowchart illustrating an example of processing procedures executed in the case that the disk array apparatus 20 has accepted the request to delete the LUN.

As illustrated in the example in FIG. 6, the disk array apparatus 20 that has accepted the request to delete the LUN from the GUI or the CLI (step S201: YES) executes a LUN deleting process (step S202).

Then, the disk array apparatus 20 releases areas in the written state bit map 234*a* and the patrol object bit map 234*b* for the deleted LUN (step S203 and step S204) and notifies the GUI or the CLI of completion of execution of the LUN deleting process (step S205) to terminate execution of the process. By executing the process in the above mentioned manner, the written state bit map 234*a* and the patrol object bit map 234*b* may be deleted as part of the LUN deleting process.

Next, processing procedures executed in the case that the disk array apparatus 20 has accepted a request to write data from the host apparatus 10 is described. FIG. 7 is a flowchart illustrating an example of processing procedures executed in the case that the disk array apparatus 20 has accepted the request to write data from the host apparatus 10.

As illustrated in the example in FIG. 7, the disk array apparatus 20 that has accepted the request to write data from the host apparatus 10 (step S301: YES) executes a data writing process (step S302).

Then, the disk array apparatus 20 sets on the bit which is included in the written state bit map 234*a* corresponding to the area into which data is to be written in a LUN concerned (step S303). That is, the bit is set on in order to set the area as a patrol object in a patrolling process which is performed next after the patrolling process has been performed using the patrol object bit map 234*b*. On the other hand, the disk array apparatus 20 sets off the bit which is included in the patrol object bit map 234*b* corresponding to the area into which data is to be written in the LUN (step S304). That is, the bit is set off in order to exclude the area so as not to be a patrol object in the next patrolling process because check for matching between written data and read data has been already performed on the area that has been once set as an object into which data is to be written in execution of the data writing process. Then, the disk array apparatus 20 notifies the host apparatus 10 of completion of execution of the data writing process (step S305) to terminate execution of the process. By executing the process in the above mentioned manner, each bit in the patrol object bit map 234*b* may be updated to an on-state as part of the data writing process. By controlling these two bit maps in the above mentioned manner, it may become possible to efficiently detect data in which any fault has not been generated in data writing and a fault has been generated later.

Figure 8:
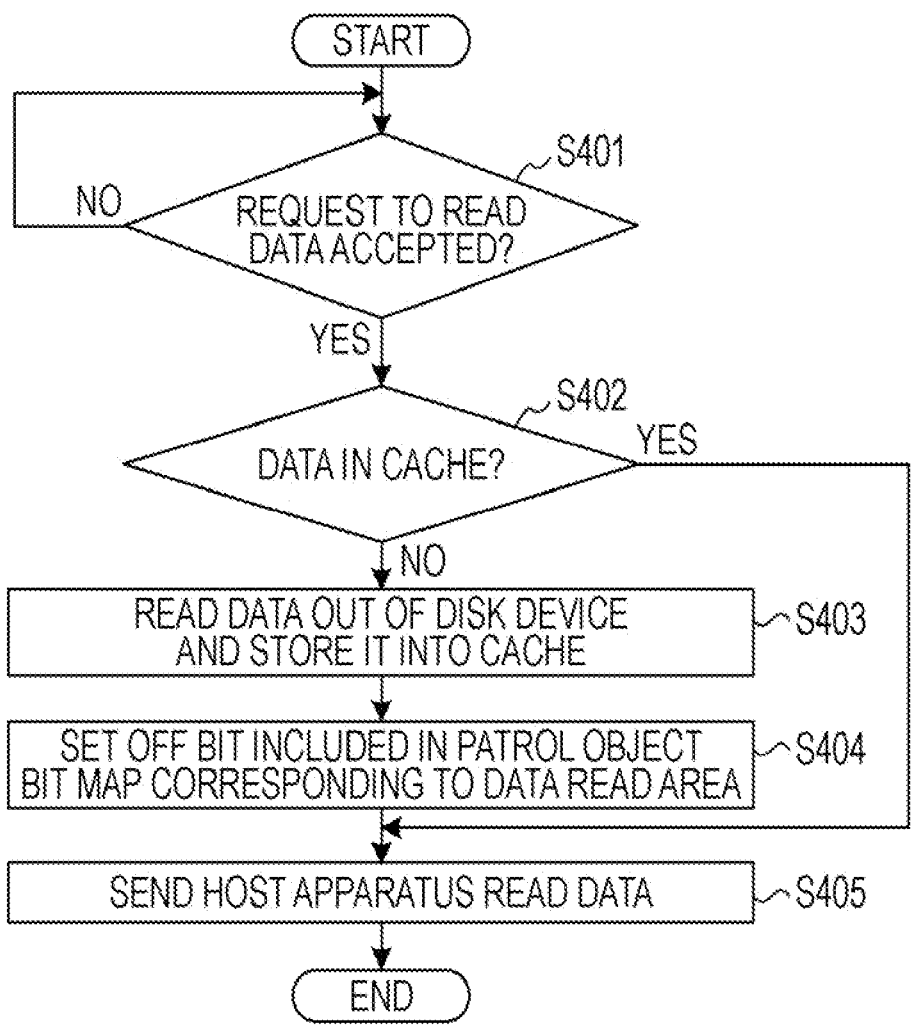
FIG. 8 is a flowchart illustrating an example of processing procedures executed in the case that the disk array apparatus has accepted a request to read data out of a storage device from the host apparatus.

Next, processing procedures executed in the case that the disk array apparatus 20 has accepted a request to read data from the host apparatus 10 is described. FIG. 8 is a flowchart illustrating an example of processing procedures executed in the case that the disk array apparatus 20 has accepted the request to read data from the host apparatus 10.

As illustrated in the example in FIG. 8, the disk array apparatus 20 that has accepted the request to read data from the host apparatus 10 (step S401: YES) confirms whether there exits data in a cache (not illustrated) (step S402).

In the case that there exists no data in the cache (step 402: NO) as a result of confirmation, the disk array apparatus 20 reads data concerned out of the disk device and stores the data into the cache (step S403). Then, the disk array apparatus 20 sets off the bit which is included in the patrol object bit map 234*b* corresponding to the area out of which the data has been read (step S404). The reason for the above lies in the fact that the area out of which the data has been normally read may be excluded so as not to be the next patrol object with no problem. In the case that there exists data in the cache concerned (step S402: YES), the process proceeds to step S405.

Then, the disk array apparatus 20 sends the host apparatus 10 the read data (step S405) to terminate execution of the process. As described above, in the case that the request to read data has been given, the area concerned is excluded so as not to be a patrol object, thereby increasing efficiency of a patrolling process.

Figure 9:
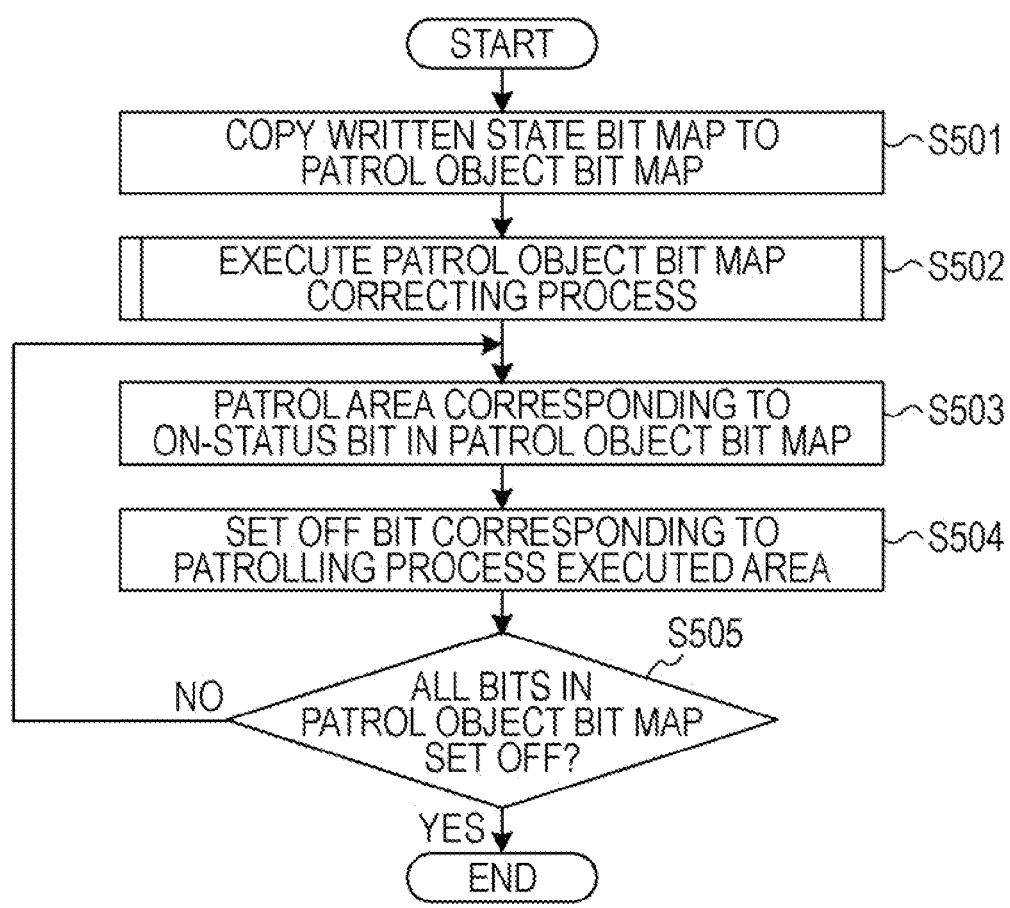
FIG. 9 is a flowchart illustrating an example of processing procedures of a patrolling process executed using the disk array apparatus.

Next, processing procedures of a patrolling process executed using the disk array apparatus 20 are described. FIG. 9 is a flowchart illustrating processing procedures of the patrolling process executed using the disk array apparatus 20. As illustrated in the example in FIG. 9, first, the content of the written state bit map 234a is copied to the patrol object bit map 234b (step S501). Although, in the following, a case in which the copying process is performed as a part of the patrolling process is described for the convenience of explanation, the coping process is executed when the previous patrolling process has been executed. For example, the copying process may be executed when the patrolling process has been performed on an area concerned, when execution of all the patrolling processes has been terminated, or when a predetermined time has elapsed after execution of the process.

Then, a correcting process is performed on the patrol object bit map 234b using the bit mal correcting process section 32b (step S502). As described above, although the above mentioned correcting process is executed when a fresh data writing or reading request has been made, correcting processes which is described later with reference to FIG. 10 and FIG. 11 are also executed when the fresh data writing or reading data has been made.

Then, the patrolling process section 33 performs a patrolling process on an area corresponding to an on-state bit in the patrol object bit map 234b (step S503), and when the patrolling process has been performed on the area concerned, sets off the bit which is included in the patrol object bit map 234b corresponding to the area on which the patrolling process has been performed (step S504). Then, in the case that there exists an on-state bit in the patrol object bit map 234b (step S505: NO), the process returns to step S503 and the same processes as the above are repeated. On the other hand, in the case that all the bits in the patrol object bit map 234b are in off-states (step S505: YES), execution of the patrolling process is terminated.

Next, the process of correcting the patrol object bit map 234b indicated at step S502 in FIG. 9 is described. FIG. 10 is a diagram illustrating an example of a process of correcting the patrol object bit map 234b which is executed using the bit map correcting process section 32b. FIG. 11 is a flowchart illustrating an example of processing procedures of one correcting process that the bit map correcting process section 32b performs on the patrol object bit map 234b.

Figure 10:
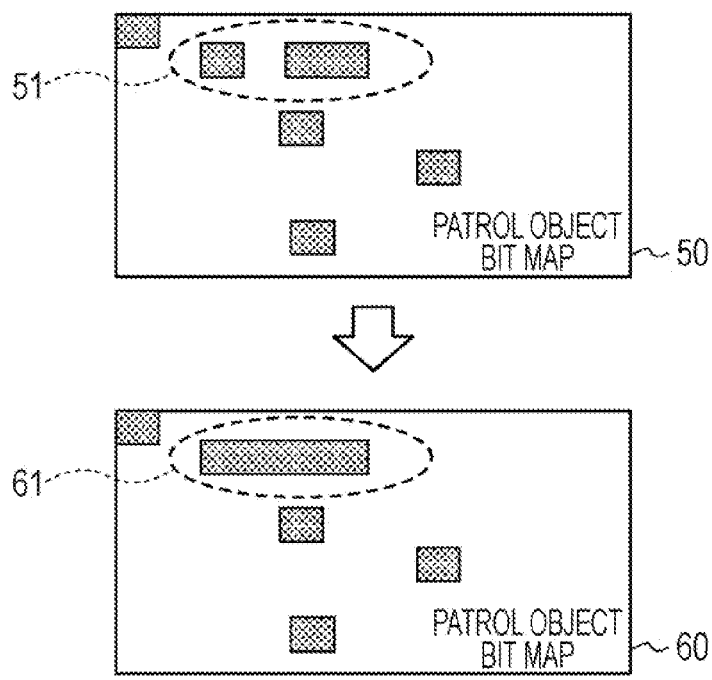
FIG. 10 is a diagram illustrating an example of a patrol object bit map correcting process executed using a bit map correcting process section.
Figure 11:
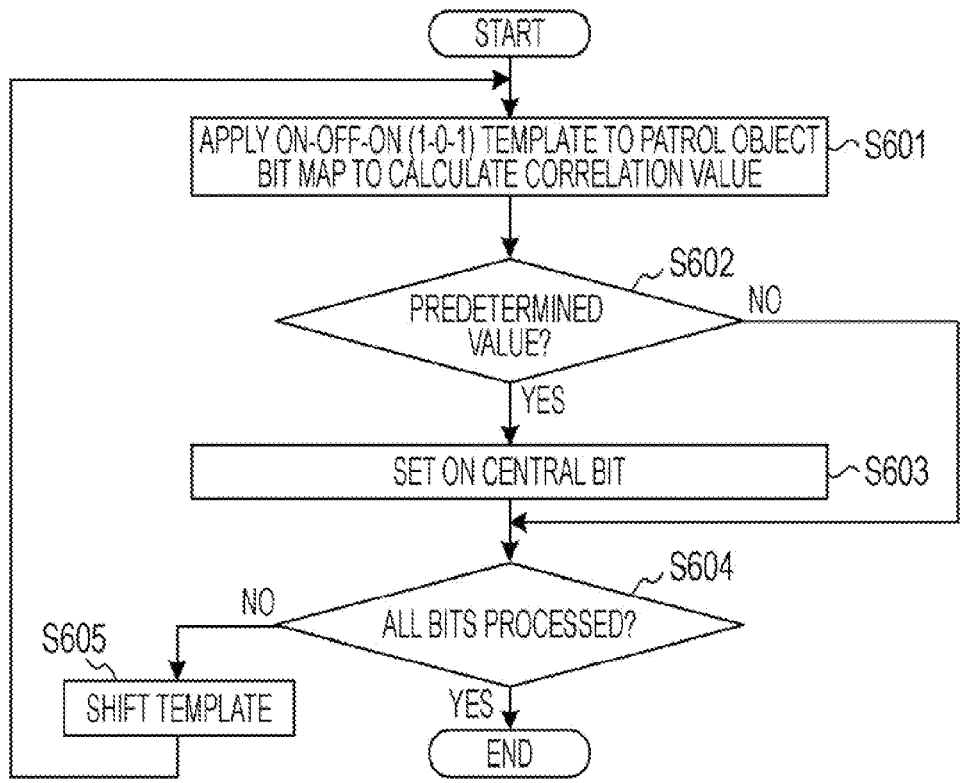
FIG. 11 is a flowchart illustrating an example of processing procedures of one patrol object bit map correcting process executed using the bit map correcting process section.

In a bit string 51 in a patrol object bit map 50 illustrated in FIG. 10, bits are respectively set on, off, on and on in this order. Thus, in the case that the patrolling process section 33 intends to perform the patrolling process on areas with reference to the patrol object bit map 50, although the areas are arranged in succession, it may be unavoidable to divide the areas into two groups and to perform the patrolling process on each group and hence efficiency of the patrolling process may be reduced.

Thus, the patrolling process section 33 corrects the bit string 51 in the patrol object bit map 50 illustrated in FIG. 10 as indicated by a bit string 61 in a patrol object bit map 60 to interpolate bits. As a result, all the bits in the bit string 61 are respectively set on, on, on and on, so that it may become possible to efficiently perform one patrolling process on areas which are arranged in succession at a time.

Specifically, as illustrated in the example in FIG. 11, an on-off-on (1, 0, 1) template is generated in advance and the template is applied to the patrol object bit map 60 to calculate a correlation value (step S601).

Then, whether the correlation value is a predetermined value (that is, "3") is confirmed (step S602). In the case that the correlation value is the predetermined value (step S602: YES), a correcting process to set on the central bit is performed (step S603).

In the case that there exists a not-yet-processed bit (step S604: NO), the template is shifted (step S605) and the process returns to step S601 to repeat the same processes as the above. Then, after all the bits have been processed (step S604: YES), execution of the process is terminated. By executing the above mentioned correcting process, it is allowed to perform the patrolling process on successively arranged areas at a time and hence efficiency of the patrolling process may be further increased.

Figure 12:
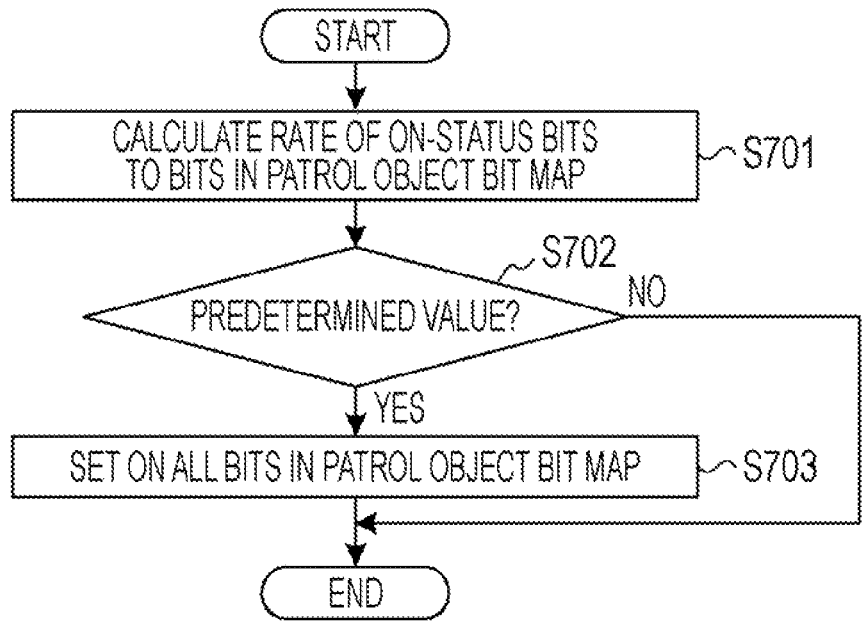
FIG. 12 is a flowchart illustrating an example of processing procedures of another patrol object bit map correcting process executed using the bit map correcting process section.

Next, another correcting process that the bit map correcting process section 32b performs on the patrol object bit map 234b is described. FIG. 12 is a flowchart of processing procedures of another correcting process that the bit map correcting process section 32b performs on the patrol object bit map 234b. In the example illustrated in the drawing, a case in which in the case that the number of areas which are set as patrol objects has exceeded a predetermined value, all the areas are set as patrol objects is indicated.

As illustrated in the example in FIG. 12, the bit map correcting process section 32b calculates the rate of on-state bits to all the bits in the patrol object bit map 234b (step S701). Then, whether the rate is more than a predetermined value is confirmed (step S702), and in the case that the rate is more than the predetermined value (step S702: YES), all the bits in the patrol object bit map 234b are set on (step S703). On the other hand, in the case that the rate is less than the predetermined value (step S702: NO), correction is not performed and execution of the process is terminated.

Owing to execution of the above mentioned correcting process, in the case that the number of areas which are regarded as patrol objects is more than a certain value, time lag taken to gain access to the patrol object bit map 234b to determine areas to be set as patrol objects may be reduced to increase efficiency of the patrolling process. Incidentally, for example, 50% may be set as the predetermined value.

Figure 13:
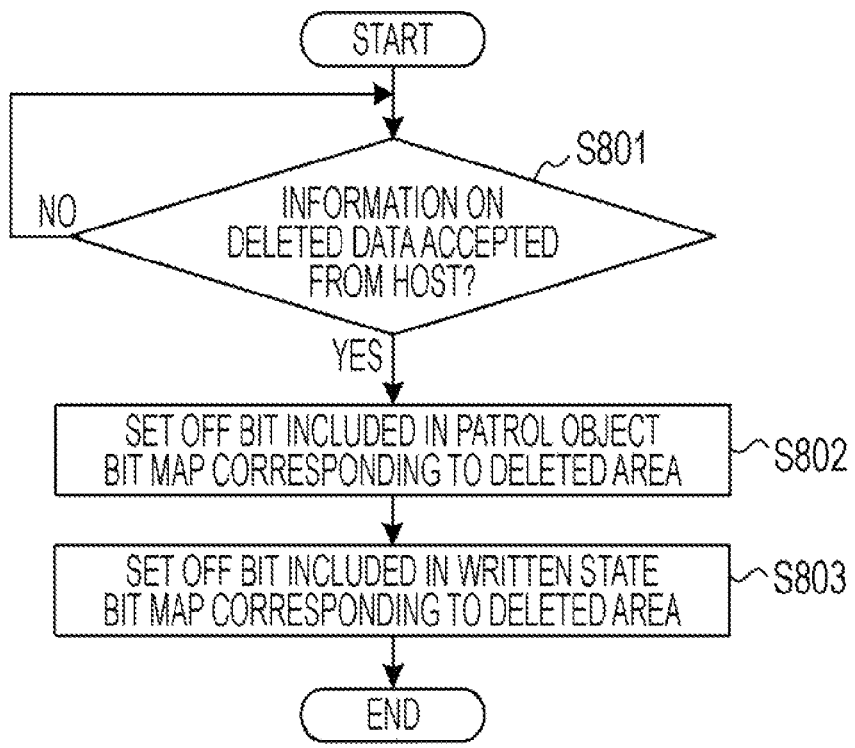
FIG. 13 is a flowchart illustrating an example of processing procedures of a further patrol object bit map correcting process executed using the bit map correcting process section.

Next, a further process of correcting the patrol object bit map 234b executed using the bit map correcting process 32b is described. FIG. 13 is a flow chart illustrating an example of processing procedures of a further correcting process that the bit map correcting process section 32b performs on the patrol object bit map 234b. In the example in the drawing, a case in which the bit map correcting process section 32b corrects the bit map in cooperation with the file system of the host apparatus 10 is indicated.

The disk array apparatus 20 is allowed to grasp that data has been written. However, in some cases, the data may be not effective. The reason for the above lies in the fact that in the case that data has been deleted using the file system of the host apparatus 10, it is not the case that the data itself which has been written into the disk array apparatus 20 is deleted and it is the case that only link data on a file allocation table in the host apparatus 10 is deleted.

Therefore, in order to perform the patrolling process only on an area in which effective data is present in reality, it may be desirable to cooperate with the file system of the host apparatus 10 so as to cope with a situation in which a file has been deleted. Thus, the bit map correcting process section 32b acquires information relating to deleted data from the file system of the host apparatus 10 and updates the written state bit map 234a and the patrol object bit map 234b on the basis of the acquired information.

As illustrated in the example in FIG. 13, the host apparatus 10 notifies the disk array apparatus 20 of the information relating to the deleted data. Specifically, every time a file is deleted, the host apparatus 10 notifies the disk array apparatus 20 of the LBA (Logical Block Address) of the deleted data as the information relating to the deleted data.

The disk array apparatus 20 that has accepted the information relating to the deleted data from the host apparatus 10 (step S801: YES) sets off the bit which is included in the patrol object bit map 234b corresponding to the area in which the deleted data has been stored (step S802). Likewise, the bit which is included in the written state bit map 234a corresponding to the area in which the deleted data has been stored is set off (step S803).

Only an area in which effective data is present in reality is allowed to be set as a patrol object by executing the above mentioned correcting process, so that it may become possible to more efficiently perform the patrolling process.

As described above, the second embodiment is configured such that the written state bit map 234a in which a bit is included in correspondence with an area into which data has been written and the patrol object bit map 234b in which a bit is included in correspondence with an area which is set as a patrol object are generated and the patrolling process section 33 performs the patrolling process on an area in which the data is present with reference to the patrol object bit map 234b. Thus, the areas concerned may be efficiently patrolled in a short time period in the case that the whole LUN is set as a patrol object.

Incidentally, the host apparatus 10 may be configured to periodically notify the disk array apparatus 20 of a currently used LBA to specify deleted data. The patrol object bit map 234b specifies the deleted data based on the currently used LBA. And the bit which is included in the patrol object bit map 234b corresponding to the area in which the deleted data has been stored is set off. The bit which is included in the written state bit map 234a corresponding to the area in which the deleted data has been stored is set off. In addition, the host apparatus 10 may be also configured such that the file system of the host apparatus 10 generates the same bit map as the written state bit map 234a itself to notify the disk array apparatus 20 of the generated bit map. The bit map generating process section 32a stores the bitmap into the memory 234 as a written state bit map. The patrolling process section 33 performs a patrolling process on the partial areas of the storage device 5 on the basis of the written state bitmap. The bit map generating process section 32a stops setting a value indicating that data is written into a partial area to a bit allocated to the partial area in which the data is written in response to a write request from the host apparatus 10.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A storage apparatus comprising:
a storage device for storing data from a host apparatus;
a written state bit map memory that stores a written state bit map that includes bits each allocated to one of partial areas of the storage device for storing write management information indicating whether written data is present in a partial area of the storage device that is allocated to one of the bits;
a bit map management section, when data is written into a partial area of the storage device in response to a write request from the host apparatus, that sets a value indicating that the data is written into the partial area to a bit allocated to the partial area in which the data is written;
a patrolling process section for performing a patrolling process on the partial areas of the storage device on the basis of the write management information stored in the written state bit map memory; and
a patrol object bit map memory that stores a patrol object bit map includes bits each allocated to one of the partial areas for storing patrol object information indicating whether partial areas allocated to the bit is a patrol object,
wherein the bit map management section copies the write management information to the patrol object information prior to an execution of a patrolling process, and the patrolling process section performs the patrolling process on the partial area of the storage device corresponding to a bit of the patrol object bit map memory that stores the patrol information indicating the patrol object,
wherein the bit map management section sets a value indicating the patrol object to a second bit of three successive bits stored in the patrol object bit map memory, in the case that a value indicating the patrol object is stored to a first bit of the three successive bits, a value not indicating the patrol object is set to the second bit of the three successive bits, and a value indicating the patrol object bit map memory is set to a third bit of the three successive bits.

2. The storage apparatus according to claim 1, wherein in the case that data is read out from a partial area of the storage device in response to a request from the host apparatus, the bit map management section sets a value indicating that the partial area from which the data is read out is not the patrol object into the bit of the patrol object bit map memory corresponding to the partial area.

3. The storage apparatus according to claim 1, wherein, when the storage apparatus receives information of deleted data from the host apparatus, the bit map management section sets a value not indicating the patrol object to a bit of the patrol object bit map memory corresponding to a partial area that stored the deleted data, and deletes a write management information corresponding to the partial area.

4. The storage apparatus according to claim 1, wherein when number of the bits of the patrol object bit map memory having a value indicating the patrol object is more than a predetermined value, the bit map management section sets a value indicating the patrol object into all of the bits of the patrol object memory.

5. The storage apparatus according to claim 1, wherein data being stored in a partial area of the storage device is read out to check normality after the data is written into the partial area in response to a write request from the host apparatus, and the bit map management section stores a value indicating that the partial area in which the data is written is not the patrol object into a bit of the patrol object bit map memory corresponding to the partial area.

6. A patrolling method comprising:
providing a written state bit map memory that stores a written state bit map that includes bits each allocated to one of partial areas of a storage device for storing write management information indicating whether written data is present in a partial area of the storage device that is allocated to one of the bits;

providing a patrol object bit map memory that stores a patrol object bit map includes bits each allocated to one of the partial areas of the storage device for storing patrol object information indicating whether each of the partial areas allocated to the bit is a patrol object;

setting a value indicating that data is written into a partial area of the storage device to a bit allocated to the partial area of the storage device in which the data is written, upon data being written into the partial area of the storage device in response to a write request from a host apparatus;

copying the write management information to the patrol object information prior to an execution of a patrolling process;

setting a value indicating the patrol object to a second bit of three successive bits stored in the patrol object bit map memory, in the case that a value indicating the patrol object is stored to a first bit of the three successive bits, a value not indicating the patrol object is set to the second bit of the three successive bits, and a value indicating the patrol object bit map memory is set to a third bit of the three successive bits, and performing the patrolling process on the partial areas of the storage device corresponding to a bit of the patrol object bit map memory that stores the patrol information indicating the patrol object.

7. A storage system comprising:

a host apparatus that sends requests for writing data and reading data; and a storage apparatus that writes data into a storage device or reads data out from the storage device in response to a request received from the host apparatus, the storage apparatus including a written state bit map memory that stores a written state bit map that includes bits each allocated to one of partial areas of the storage device for storing write management information indicating whether written data is present in a partial area of the storage device that is allocated to one of the bits;

a bit map management section, when data is written into a partial area of the storage device in response to a write request from the host apparatus, that sets a value indicating that the data is written into the partial area to a bit allocated to the partial area in which the data is written;

a patrolling process section for performing a patrolling process on the partial areas of the storage device on the basis of the write management information stored in the written state bit map memory; and a patrol object bit map memory that stores a patrol object bit map includes bits each allocated to one of the partial areas for storing patrol object information indicating whether partial areas allocated to the bit is a patrol object, wherein the bit map management section copies the write management information to the patrol object information prior to an execution of a patrolling process, and the patrolling process section performs the patrolling process on the partial area of the storage device corresponding to a bit of the patrol object bit map memory that stores the patrol information indicating the patrol object, wherein the bit map management section set a value indicating the patrol object to a second bit of three successive bits stored in the patrol object bit map memory, in the case that a value indicating the patrol object is stored to a first bit of the three successive bits, a value not indicating the patrol object is set to the second bit of the three successive bits, and a value indicating the patrol object bit map memory is set to a third bit of the three successive bits.

8. The storage system according to claim 7, wherein, when the host apparatus deletes data, the host apparatus notifies the storage apparatus of information of the data deleted, and when the storage apparatus receives the information of the data deleted from the host apparatus, the bit map management section deletes the write management information corresponding to a partial area of the storage device which includes the data deleted.

9. The storage system according to claim 7, wherein, the host apparatus generates a same bit map as the written state bit map of the storage apparatus and send the generated bit map to the storage apparatus periodically, and when the storage apparatus receives the bit map, the bit map management section stores the received bit map into the written state bit map memory as a written state bit map and stops setting a value indicating that data is written into a partial area to a bit allocated to the partial area in which the data is written in response to a write request from the host apparatus.

* * * * *